United States Patent [19]

Amiet et al.

[11] Patent Number: 5,559,843
[45] Date of Patent: Sep. 24, 1996

[54] DEVICE FOR MOUNTING AND EXTRACTING A LOCKING SLEEVE OF A GUIDE TUBE IN A DISMOUNTABLE END NOZZLE OF A NUCLEAR REACTOR FUEL ASSEMBLY

[75] Inventors: Pierre Amiet, Condrieu; Serge Roillet, Lyons, both of France

[73] Assignees: Framatome, Coupole; Cogema, Velizy Villacoublay, both of France

[21] Appl. No.: 498,015

[22] Filed: Jul. 3, 1995

[30] Foreign Application Priority Data

Jul. 7, 1994 [FR] France ................... 94 08429

[51] Int. Cl.⁶ .................................................. G21C 19/32
[52] U.S. Cl. ............................................... 376/261; 294/94
[58] Field of Search .................................. 376/260, 261, 376/285, 446, 449; 294/86.24, 86.25, 93, 94, 96; 29/255, 282, 723

[56] References Cited

U.S. PATENT DOCUMENTS

| 4,134,789 | 1/1979 | Aubert ...................... 376/262 |
|---|---|---|
| 4,639,998 | 2/1987 | Shallenberger et al. ........... 376/261 |
| 4,643,472 | 2/1987 | Schukei et al. .................. 294/94 |
| 4,664,874 | 5/1987 | Shallenberger et al. ........... 376/261 |
| 5,037,603 | 8/1991 | Wood et al. ................... 376/260 |
| 5,091,142 | 2/1992 | Petit .......................... 376/261 |
| 5,118,465 | 6/1992 | Guironnet et al. .............. 376/261 |
| 5,120,492 | 6/1992 | Guironnet et al. .............. 376/261 |

FOREIGN PATENT DOCUMENTS

| 362009 | 4/1990 | European Pat. Off. . |
|---|---|---|
| 469627 | 2/1992 | European Pat. Off. . |

*Primary Examiner*—Daniel D. Wasil
*Attorney, Agent, or Firm*—Pollock, Vande Sande & Priddy

[57] ABSTRACT

The lower part (31) of the pole (10) carries an expansible bush (40) engaged and fixed on the outer surface of the part (31) by one of the ends (41) of the bush and comprising longitudinally extending slots defining resiliently bendable strips. A group of balls (39) mounted to be radially movable in openings (38) in the lower part (31) of the pole (10) and bearing against the bendable strips of the expansion bush are movable between a retracted position and a position for expanding the bush (40), by a cylindrical cam (36) connected to an actuating rod (20). The device permits inserting the locking sleeve (8) in the guide tube (13) without risk of deformation of the end strips of the guide tube (13).

11 Claims, 4 Drawing Sheets

DEVICE FOR MOUNTING AND EXTRACTING A LOCKING SLEEVE OF A GUIDE TUBE IN A DISMOUNTABLE END NOZZLE OF A NUCLEAR REACTOR FUEL ASSEMBLY

FIELD OF THE INVENTION

The invention relates to a device for mounting and extracting a locking sleeve of a guide tube in a dismountable end nozzle of a fuel assembly of a nuclear reactor cooled with light water and in particular of a pressurized water cooled reactor.

BACKGROUND OF THE INVENTION

Water cooled nuclear reactors and in particular pressurized water nuclear reactors comprise assemblies formed by a bundle of fuel rods of great length arranged parallel to one another and maintained in a framework formed by guide tubes, spacer elements and two end nozzles. The guide tubes extend in the longitudinal direction of the assembly and are connected to transverse spacer elements evenly spaced apart along the length of the assembly.

The guide tubes are also connected at each of their ends to one or the other of the two end nozzles constituting parts which stiffen and close the assembly.

The fuel rods of the assembly constitute a bundle in which the rods are parallel to one another and disposed in the transverse sections of the assembly in accordance with an even network determined by the spacer elements. Some locations of the network are occupied by guide tubes which are generally rigidly connected to the spacer elements.

The guide tubes have a length exceeding the length of the fuel rods and are placed in the bundle in such manner as to comprise a part which projects from the fuel rod bundle at each of their ends. The end nozzles are fixed to these projecting parts of the guide tubes so as to close the assembly at each of its ends.

The fuel rods are constituted by sintered pellets of nuclear fuel material stacked inside a metal sheath insulating the pellets from the fluid surrounding the fuel assembly.

In the event of a fracture of the sheath of a rod of a fuel assembly, the fuel assembly must be very rapidly replaced in order to avoid leakage of the radioactive product in the reactor coolant fluid.

The fuel assemblies having defective rods are extracted from the vessel of the reactor in which the core is disposed during a shutdown of the reactor for repairs and/or recharging. These assemblies are placed in a storage or deactivation pool placed adjacent the building of the nuclear reactor.

In order to be able to re-use the assemblies having defective fuel rods, it is desirable to be able to replace by new rods the defective rods whose sheath is cracked.

For the purpose of carrying out operations for replacing defective rods in the storage pool, fuel assemblies have been constructed comprising at least one dismountable end nozzle. After dismounting the end nozzle in the storage pool, access may be gained to the fuel rods for replacing the latter. The dismounting of the end nozzle involves the elimination of the connections between the ends of the guide tubes and the end nozzle.

The dismountable end nozzles of fuel assemblies comprise through openings reproducing the network of the guide tubes in each of which a guide tube is engaged and fixed.

The fuel assemblies which permit the replacement of the defective rods or other operations in the network of fuel rods comprise guide tubes of which the connection with at least one of the end nozzles is dismountable.

In order to replace the defective fuel rods, the assembly is placed in a vertical position under water inside a storage cell in the fuel pool.

The storage cell rests on the bottom of the pool and maintains the assembly in the vertical storage position. In this position, the upper end nozzle of the assembly is accessible under a given water head from above the pool, optionally after having slightly raised the assembly inside the cell.

In a known type of a dismountable fuel assembly, the parts of the guide tubes engaged in the upper end nozzle of the assembly comprise a radially expansible part which may be formed by the end part of the guide tube in which longitudinal slots have been machined so as to define flexible cylindrical sectors, or may be formed by an expansible split collar mounted on the end of the guide tube.

The end of the guide tube or the split collar, which may have a slightly tapered shape are adapted to be engaged in a part of the opening of the end nozzle of corresponding shape.

The end part of the guide tube or of the expansible collar comprise a radially projecting part adapted to be engaged in an annular recess machined in the opening of the end nozzle.

The guide tube is fixed inside the end nozzle by a locking sleeve which is inserted in the guide tube and effects the radial expansion of the split collar and the fastening of the guide tube whose radially projecting part engages in the recess machined in the end nozzle.

The locking sleeve generally comprises a locking part proper of generally tapered or frustoconical shape adapted to be engaged in the end part of the guide tube, and a fixing part constituted by a deformable collar which may be set in recesses machined in the opening of the end nozzle outside the zone in which the guide tube is engaged. In this way, the locking sleeve is fixed in position and cannot be lost. The locking sleeves comprise on their inner surface a hooking groove in which may be engaged the claws of a grappling device for extracting the locking sleeve, possibly after disengagement of the set parts of the collar from the recesses of the end nozzle.

Devices for extracting and mounting a locking sleeve of a fuel assembly guide tube are known in the art, for example that disclosed in French patent Patent No. 2,636,766, which comprise a very long pole or boom fixed in a vertical position to handling and hoisting means which are movable above the pool of the reactor. The pole comprises a lower end part which has a diameter less than the inside diameter of the locking sleeve and in which the claws of the hooking grappling device for the sleeve are mounted.

A rod disposed on the axis of the pole and mounted to be movable in the axial direction permits actuating the claws so as to shift them from their retracted position in the lower part of the pole and a projecting position for hooking onto the locking sleeve.

To extract a locking sleeve, the pole is lowered into the storage pool over the fuel assembly in such manner that its lower part can be engaged inside the locking sleeve of a guide tube.

The engagement of the lower end of the pole is facilitated by the fact that the lower end of the pole terminates in the form of an engaging cone. The lower part of the pole is engaged in the sleeve until abutment means mounted on the pole come to bear against a shoulder inside the sleeve of the fuel assembly. The hooking claws of the pole are then at the level of the hooking groove of the locking sleeve. The actuating rod permits shifting the claws from their retracted position inside the lower part of the pole to the projecting position in which the claws enter the hooking groove of the sleeve.

The locking sleeve may then be extracted by pulling on the pole vertically upwardly.

A locking sleeve may be placed in position and mounted in a guide tube of a dismountable end nozzle by means of a mounting device the construction of which is substantially similar to that of the extracting tool.

It is also possible to employ the same tooling for mounting and extracting locking sleeves of dismountable end nozzles of fuel assemblies.

The locking sleeve is mounted and placed in position by inserting the lower part of the pole in a locking sleeve disposed in a store or storage zone in the vicinity of the fuel assembly on which an end nozzle is remounted.

A device for maintaining the sleeve fixed on the outer surface of the pole, or hooking claws placed in confronting relation to the hooking groove of the sleeve, permits picking up the sleeve which may in this way be conveyed by means of the pole to a zone located exactly in vertical alignment with the opening of the end nozzle and with the guide tube engaged in this opening in which the locking sleeve must be placed.

The locking sleeve is then inserted in the guide tube by axially shifting the sleeve.

The sleeve is placed in the locking position generally by means of a thrust device which engages a bearing ledge in the bore of the locking sleeve. In this way the sleeve is mounted and engaged forcefully in its locking position.

The mounting of the sleeve is completed by a setting or punching operation on the deformable parts of the collar constituting the upper part of the locking sleeve to cause them to penetrate the recesses machined in the end nozzle and opening onto the guide tube receiving opening. This operation is generally carried out with a tool which is different from the mounting and extracting tool.

Certain difficulties are encountered, in the use of a device for mounting locking sleeves of the type described hereinbefore, in the case where the upper part of the guide tube is slightly deformed, in particular in the case where some of the cylindrical sectors constituting flexible strips separated by the slots in the end part of the guide tube are bent toward the interior of the bore of the guide tube. The end part of the pole which includes an engagement cone, may be inserted in the bore of the guide tube notwithstanding the reduction of the section due to the deformation of the flexible strips, but the end of the locking sleeve engaged on the lower end part of the pole is liable to assume a position of abutment on the ends of the flexible strips bent inwardly, or even overlap these end parts. In this case, if the imperfect engagement of the sleeve is not immediately detected, the end of the guide tube may be deformed and seriously damaged.

It is then necessary to carry out repairs which may be long and costly.

The operations for mounting the end nozzle of the fuel assembly which depend on the state of the end of the guide tube are therefore not all carried out in a very reliable and rapid manner.

SUMMARY OF THE INVENTION

An object of the invention is to provide a device for mounting and extracting a locking sleeve of a guide tube in a dismountable end nozzle of a fuel assembly disposed under water in a storage pool, the end nozzle of the assembly comprising a transverse plate through which extend a group of openings each receiving an end part of a respective guide tube of the assembly comprising bendable sectors separated by longitudinally extending slots and a radially projecting hooking part receiving a locking sleeve in its inner part for achieving the radial expansion and the hooking of the guide tube by its hooking part in an annular enlargement of the opening of the end nozzle. The mounting and extracting device comprises a pole which is connected in a vertical position to handling and hoisting means disposed over the pool and comprises at least one lower end part which has a diameter less than the inside diameter of the locking sleeve and in which are movably mounted at least two locking sleeve-hooking members having actuating surfaces arranged to be cooperative with a movable rod extending in the axial direction inside the pole, so that the hooking members are shifted between a retracted position inside the lower part of the pole and a locking sleeve-hooking projecting position of engagement with an inner groove of the locking sleeve, when the lower part of the pole is inserted in the locking sleeve. The device ensures in a very reliable manner the engagement of the locking sleeve in the guide tube at the moment of the mounting of the guide tube and avoids any risk of deterioration of the end part of the guide tube.

For this purpose, the lower part of the pole carries an expansion bush engaged and fixed on its outer surface at one of its ends and comprising longitudinally extending slots defining resiliently bendable strips at least in an end part of the bush remote from the end fixed to the lower part of the pole, a group of balls each mounted to be radially movable in an opening in the lower part of the pole and each bearing against a respective bendable strip of the expansion bush, and a cylindrical cam mounted on the actuating rod and bearing against the balls and permitting the displacement of the balls between a retracted position and a position of expansion of the end of the bendable strips of the expansion bush, up to a diameter larger than the outside diameter of the locking sleeve, by displacement of the actuating rod.

BRIEF DESCRIPTION OF THE DRAWINGS

In order to explain the invention, there will now be described by way of example a device for mounting and extracting a locking sleeve according to the invention and the manner of using the device for mounting a locking sleeve of a guide tube of a dismountable fuel assembly end nozzle for a pressurized water nuclear reactor.

FIG. 3A represents the lower part of the mounting and extracting device in a first operational position corresponding to the retracted state of the hooking claws and of the expansion bush.

FIG. 3B represents a second operational state of the lower part of the mounting device in which the hooking claws and the expansion bush are in an active outer position.

DETAILED DESCRIPTION

Figure 1:
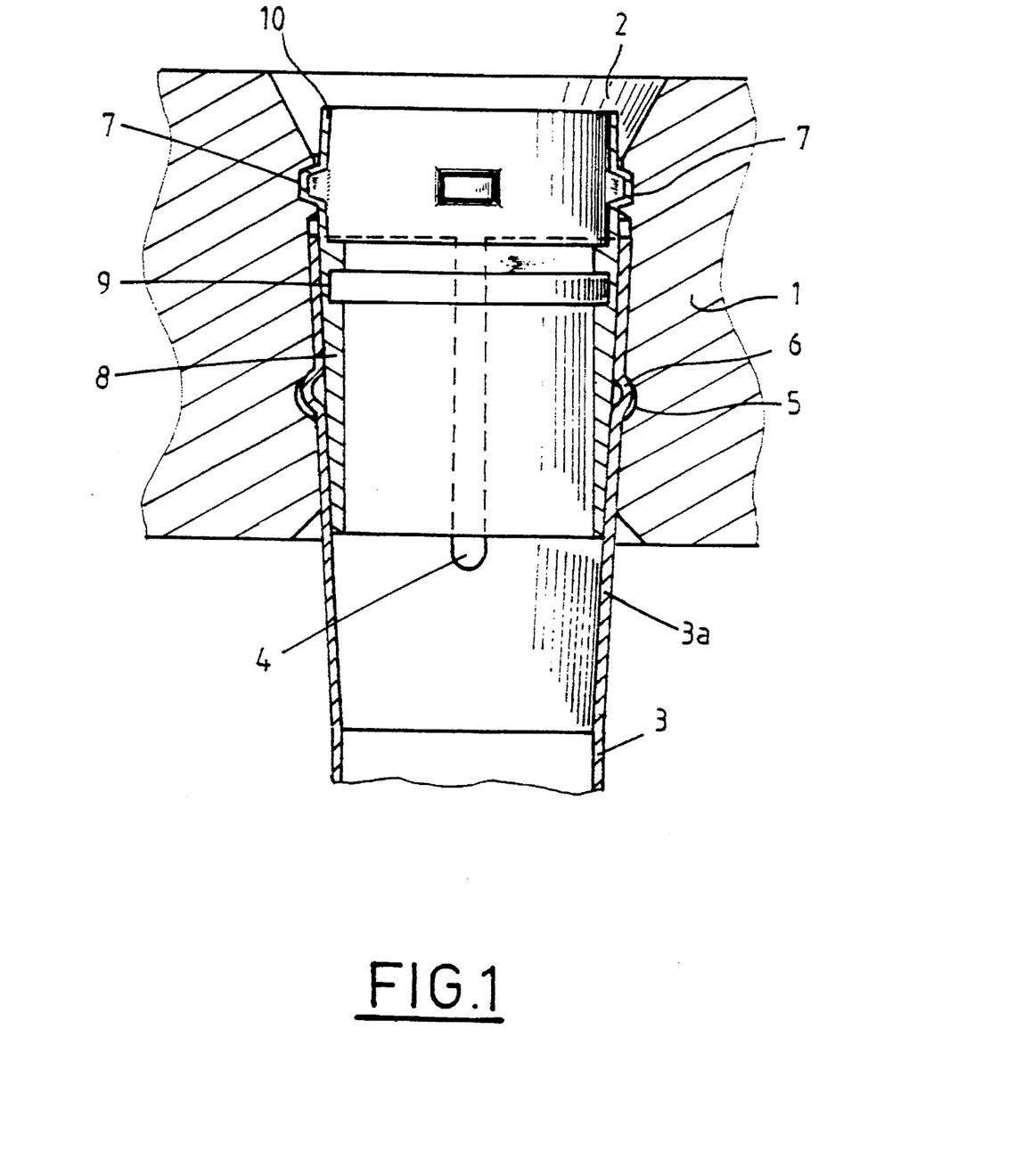
FIG. 1 is a sectional view in an axial plane of the end part of a guide tube engaged in a dismountable end nozzle of a fuel assembly and fixed in position by a locking sleeve.

FIG. 1 shows a part of a dismountable end nozzle of a fuel assembly comprising a transverse plate 1, termed adapting plate, through which extend openings such as 2 in each of which there is engaged an upper end part 3a of a guide tube 3.

The upper end part 3a of the guide tube 3 shown in FIG. 1 has a frustoconical shape and the opening 2 has a part having a corresponding frustoconical shape for receiving the end part 3a of the tube 3.

The end part 3a of the tube 3 comprises longitudinally extending slots 4 dividing the end part 3a of the guide tube 3 into a plurality of substantially cylindrical or frustoconical sectors which are capable of deforming by bending to permit the engagement and the fixing of the end part 3a of the guide tube 3 in the opening 2.

In its part in which the end part 3a of the guide tube 3 is engaged, the opening 2 comprises an annular groove 5 in which is engaged, when the end part of the guide tube is fixed in the adapting plate 1 of the end nozzle, a radially projecting part 6 of the guide tube 3 of substantially toric shape. The projecting part 6 of the guide tube 3 extends along the width of each of the sectors of the end part 3a of the tube 3 separated by the slots 4.

The end part 3a of the tube 3 extends in only a part of the length of the opening 2; the remaining part of the opening 2, opening onto the upper face of the adapting plate, has an upwardly divergent cylindro-frustoconical shape and includes radially outwardly extending recesses relative to the wall of the opening 2.

A locking sleeve 8 is inserted in the end part 3a of the tube 3 to ensure that the sectors of the guide tube 3 separated by the slots 4 are maintained in a spread-apart position. In this position, the projecting part 6 of toric shape of the guide tube 3 is maintained in the groove 5 of the opening 2.

The locking sleeve 8 comprises a locking part proper having a frustoconical outer surface whose shape corresponds to the frustoconical shape of the tube 3 and of the inner part of the opening 2 of the adapting plate. In this locking part, a groove 9 is formed inside the locking sleeve for the engagement of hooking members of the device for mounting and extracting the locking sleeve 8.

The upper part of the locking sleeve is constituted by a ring 10 which may be deformed by a setting or punching operation into recesses 7 so as to cause the locking sleeve to be fixed and immobilized in the opening 2 extending through the adapting plate 1.

The adapting plate 1 of the dismountable end nozzle comprises twenty-four openings similar to the opening 2 reproducing the arrangement of the guide tubes within the bundle of the fuel assembly.

A tube 3 is engaged and fixed in each of the openings 2.

In order to mount a sleeve 8 in a guide tube 3 engaged in an opening 2 extending through the adapting plate 1 of a dismountable end nozzle of a fuel assembly, the sleeve 8 is taken up by a tool comprising hooking claws which are engaged in the groove 9. The sleeve 8 is fed in the axial direction so as to become engaged in the divergent part of the opening 2 and then in the end part of the guide tube 3.

In the event that at least one of the cylindrical sectors separated by the slots 4 constituting the upper part 3a of the tube 3 is bent inwardly, the sleeve 8 is liable to bear against the outer surface of this inwardly bent sector.

The downward axial travel of the locking sleeve at the end of the mounting tool then creates deformation by a bending of the deformable sector of the tube 3.

The device shown in FIGS. 2A, 2B and 3A, 3B, which will be described hereinafter, permits avoiding this drawback when mounting the locking sleeve and generally carrying out the locking sleeve mounting and extracting operations in a reliable and rapid manner.

Figure 2A:
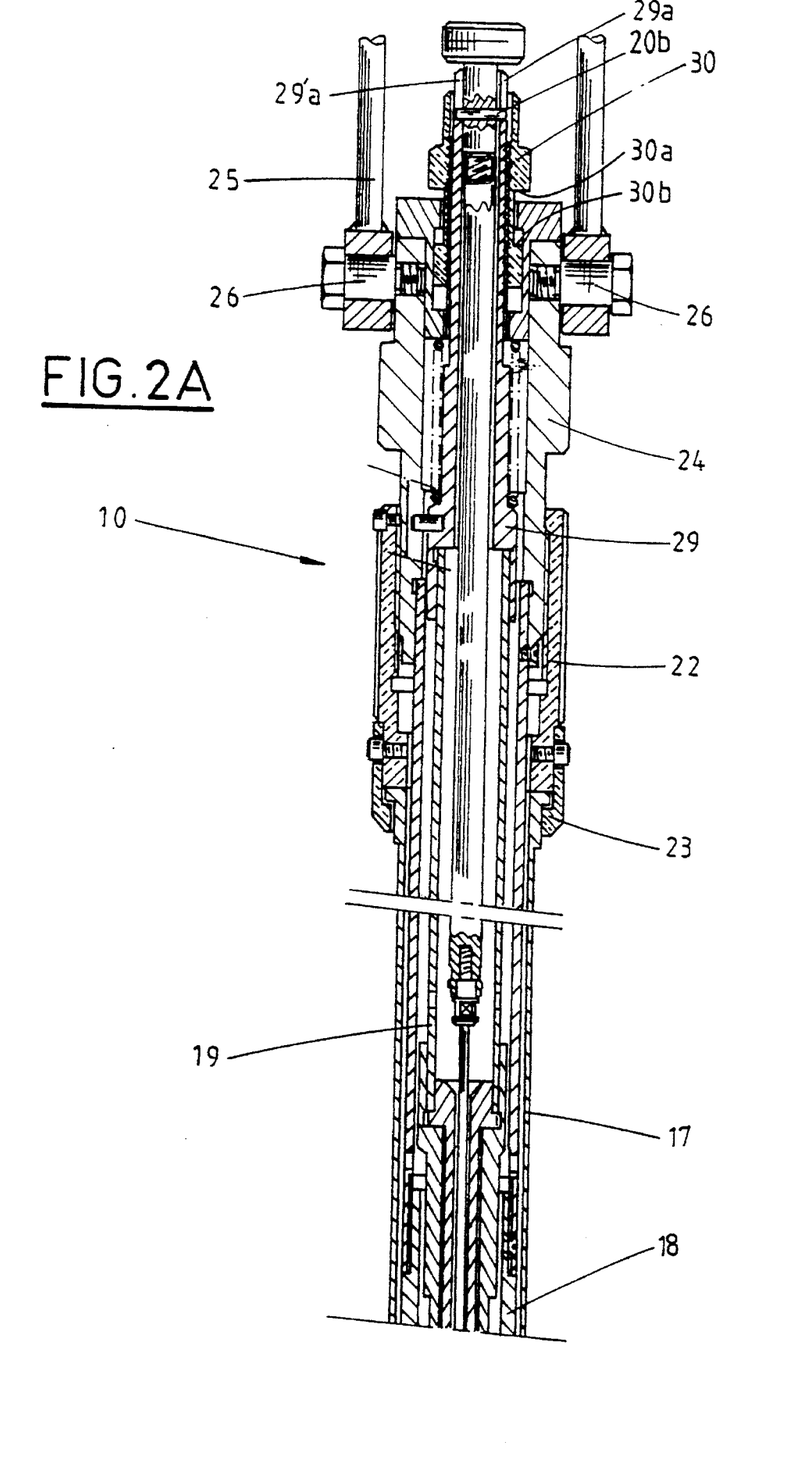
FIG. 2A is a view, partly in elevation and partly in section in a vertical plane, of the upper part of a device for mounting and extracting according to the invention.
Figure 2B:
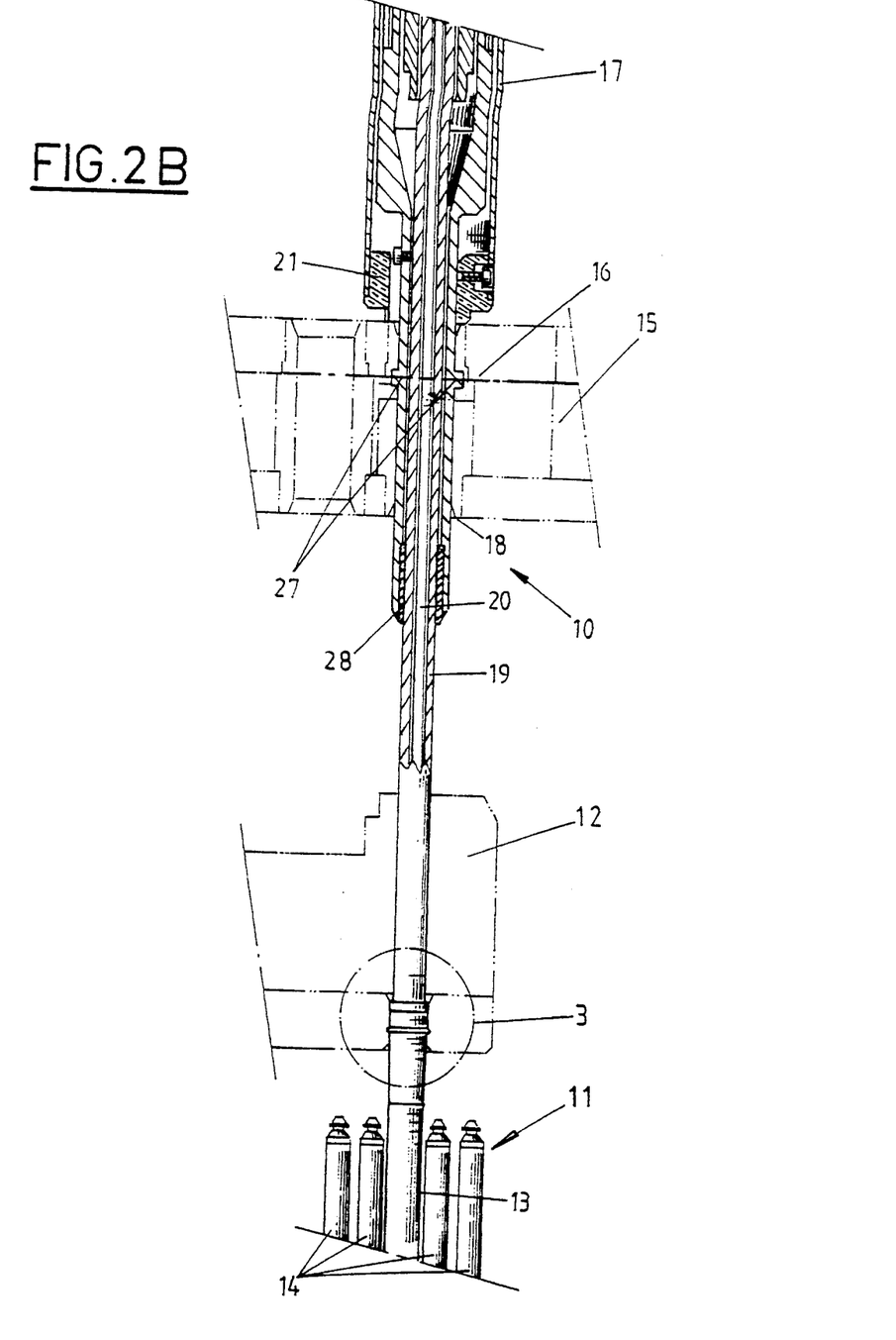
FIG. 2B is a view, partly in elevation and partly in section in a vertical plane, of the lower part of the mounting and extracting device according to the invention during the mounting of a locking sleeve in a dismountable end nozzle and a guide tube of a fuel assembly.

FIGS. 2A and 2B show the mounting and extracting device 10 according to the invention.

In FIG. 2B, the lower part of the device 10 is shown to be engaged in the operating position in a guide tube of a fuel assembly 11 the upper end nozzle 12 of which is of the dismountable type.

The dismountable end nozzle 12 comprises an adapting plate through which extend openings in which are engaged the upper end parts of the guide tubes 13 of the assembly containing in certain locations of the network the rods 14 of the assembly.

The guide tubes 13 have a length greater than the length of the rods 14 and are connected to the dismountable end nozzle 12 by an end part which projects from the upper ends of the fuel rods 14 in position in the bundle of the fuel assembly.

The upper end part of the guide tube 13 is similar to the upper end part of the guide tube 3 shown in FIG. 1 and may be fixed in the adapting plate of the end nozzle 12 by means of a locking sleeve such as the locking sleeve 8 shown in FIG. 1. Generally, the elements for fixing the guide tube 13 in the adapting plate of the dismountable end nozzle 12 are identical to the elements described with reference to FIG. 1.

The fuel assembly 11 is disposed in a storage cell at the bottom of the pool of the fuel of a nuclear reactor, the upper part of the fuel assembly 11 projecting from the upper part of the cell (not shown in FIG. 2B).

For the purpose of guiding the lower part of the device for extracting and mounting the sleeve 10 relative to the interior of an opening of the adapting plate of the end nozzle 12 and the interior of the corresponding guide tube, there is employed a plate 15 for guiding and maintaining the tool which is fixed to the upper part of the cell above and in vertical alignment with the dismountable end nozzle 12 of the fuel assembly.

The guiding and maintaining plate 15 comprises a group of openings each of which are disposed in alignment with an opening of the adapting plate of the end nozzle 12 receiving a guide tube 13.

Further, the plate 15 comprises means 16 for locking a guiding part of the tool 10 which maintains the tool and takes the strain of the forces employed during the operations for extracting and mounting a locking sleeve. These means comprise a recess machined in the plate 15 permitting a bayonet-type of locking of the lower part of the tool 10, as will be explained hereinafter.

As can be seen in FIGS. 2A and 2B, the device 10 for mounting and extracting locking sleeves is in the form of a vertical pole or boom of great length constituted by an assembly of tubular elements mounted in coaxial relation to one another.

Generally, the device 10 comprises a first outer tubular element 17, a second intermediate tubular element 18 disposed in the first outer element 17, and a third inner tubular element 19 disposed in the intermediate tubular element 18.

An actuating rod 20 is mounted in the inner element 19 on the axis common to the three elements 17, 18, 19.

Each of the tubular elements 17, 18, 19 comprises a plurality of successive sections interconnected end to end in the axial direction of the device 10.

The first outer tubular element 17 comprises at its lower end an adjustable bearing ring 21 adapted to bear against the upper part of the guiding and fixing plate 15 when using the mounting and extracting device 10 in a guide tube 13 of the fuel assembly. The ring 21 constitutes an abutment which takes the axial locking force of the tool after it is fixed by a bayonet-type locking in an opening of the maintaining and guiding plate 15.

The upper part of tubular element 17 is connected to a nut 22 by a fixing collar 23 so that the nut 22 is free to rotate relative to the outer tubular element 17 and drives the element 17 in translation in the axial direction.

The nut 22 is engaged on a screw-threaded outer part of the head 24 of the device 10 on which is fixed, by means of screws 26, the handle 25 for handling the pole which constitutes the mounting and extracting device 10.

The handle 25 in the form of an arc is hooked to a sling connected to the hoisting cable of a winch of a hoisting and handling machine which travels over and above the level of the storage pool of the fuel.

In this way, it is possible to shift the pole constituting the device 10 to a vertical position in the storage pool above storage racks comprising cells in which the fuel assemblies are disposed.

By screwing or unscrewing the nut 22 on the threaded part of the head 24, the ring 21 of the outer tubular element 17 is made to bear against the upper face of the guiding and fixing plate 15.

The intermediate tubular element 18 comprises a lower part of small diameter extending below the bearing ring 21 of the outer element 17 and including radially projecting parts 27 constituting hooking members for hooking the device 10 to the hooking means 16 of the plate 15 formed by recesses opening onto the interior of a guiding opening of the plate 15 disposed in the axial extension of a guide tube 13.

The tubular element 18 comprises an upper part of larger diameter than the lower part disposed in the outer tubular element 17 which is connected in its upper part to the head 24 of the device 10 connected to the handle 25.

The handle 25 permits placing the intermediate element 18 in such position as to shift the locking members 27 which are cooperative with the locking recesses 16 of the maintaining plate 15.

The lower part of the intermediate tubular element 18 is also fixed to a sliding bearing 28 in which the lower part of the inner tubular element 19 is slidably engaged.

The inner tubular part 19 is connected to a screw 29 of tubular shape engaged with a nut 30 whereby it is possible to shift the inner element 19 in the axial direction so as to exert a thrust or a pull on the locking sleeve.

The actuating nut 30, engaged on the screw 29 in the upper end part of the device 10 in the region of the handle 25, can be turned by an operator from the upper part of the storage pool.

The upper part of the screw 29 includes on its outer surface a graduation whereby it is possible to very precisely note the position of the nut 30. The nut 30 comprises two shoulders 30a and 30b adapted to bear against the upper part of the head 24 for unclamping the locking sleeve by raising the element 19 inside the intermediate element 18 or for clamping the locking sleeve by a downward movement of the element 19.

The actuating rod 20 is slidably mounted in the bore of the central tubular element 19.

The rod 20 may be actuated from the upper part of the device 10, in the region of the handle 25, for shifting it in the axial direction or turning it about its axis for actuating the hooking members and the expansion bush of the lower part of the device 10.

The upper part of tubular screw 29 includes two identical cavities 29a and 29'a located in alignment with each other and permitting the engagement and a fixing of bayonet type of the rod 20 by means of a pin 20b in an upper position for unlocking the claws of the tool or in a lower locking position.

Figures 3A, 3B:
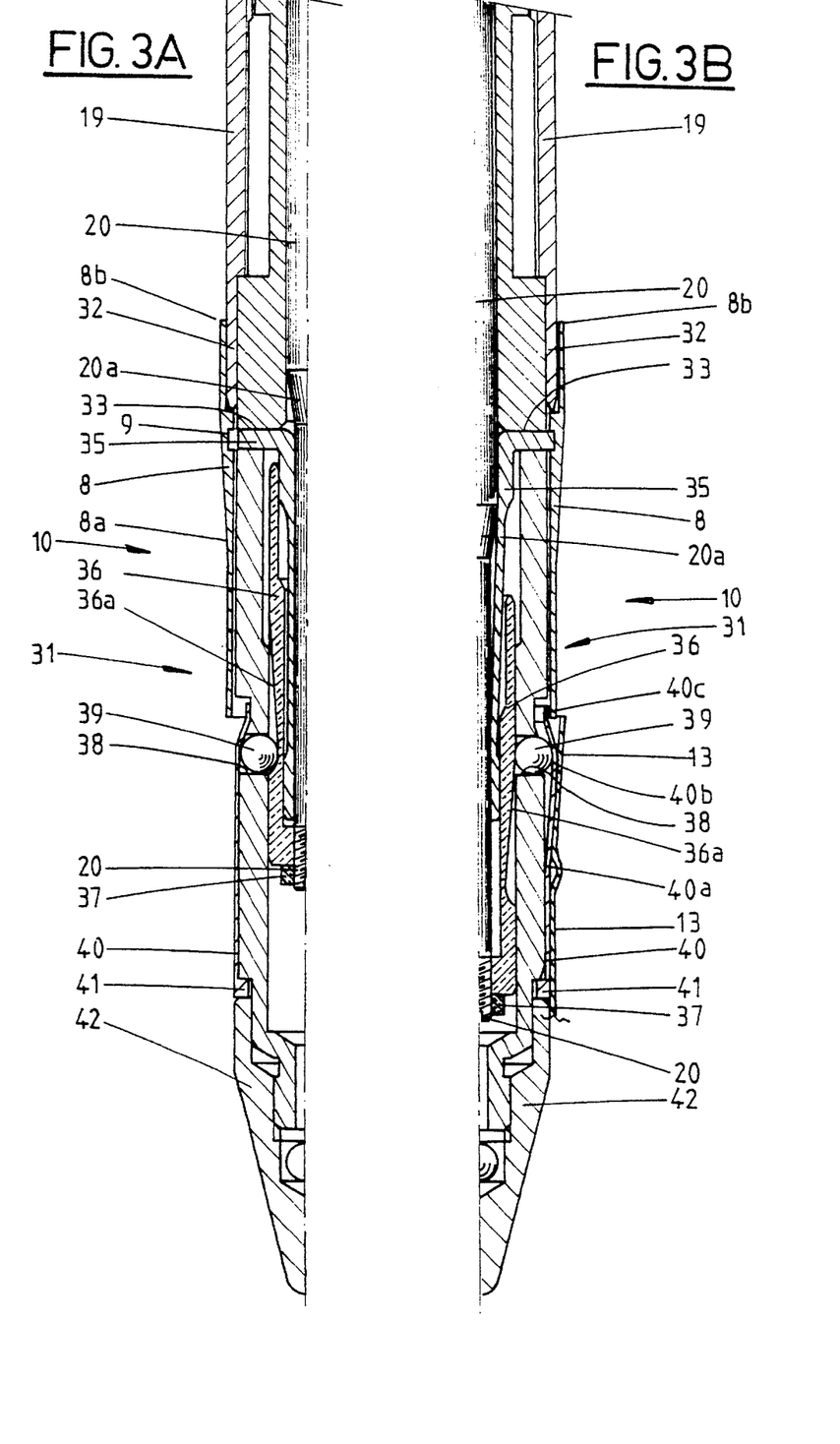
FIGS. 3A and 3B are semi-sectional views to a larger scale of the detail 3 of FIG. 2B.

As can be seen in FIGS. 3A and 3B, the lower part of the inner tubular element 19 is connected to a shaft 31 constituting the lower part of the pole of the sleeve extracting and mounting device.

The lower part of the tubular element 19 is engaged and fixed on the shaft 31 so as to present an annular part 32 which radially projects relative to the shaft and is adapted to engage in the upper part of the locking sleeve 8 for abutment against a shoulder separating the locking part proper 8a of frustoconical shape of the locking sleeve from a deformable collar 8b constituting the upper locking part of the sleeve 8.

As will be explained hereinafter, the thrust exerted on the sleeve 8 for inserting and locking it in the guide tube will be produced by means of the projecting annular part 32 bearing against the shoulder.

The shaft 31 comprises radially extending openings 33 in each of which is slidably mounted the upper part of a hooking claw 35 for the sleeve 8.

Each of the claws 35 comprises an axially extending flexible strip. The claws 35 are arranged the rod 20 which is slidably mounted in the central bore of the inner tubular element 19 and the bore of the tubular shaft 31.

The part of the bore of the tubular shaft 31 in which the claws 35 are mounted around the rod 20 has a diameter substantially larger than the diameter of the upper part of the bore of the shaft 31 in which the actuating rod 20 is mounted substantially without clearance.

Mounted around the outer lateral surface of the strips of the claws 35 is a guide sleeve 36 connected to the lower part of actuating rod 20 by means of a screw-threaded end part of the actuating rod 20, screwed in a tapped bore of the guide sleeve 36, and a lock nut 37.

The guide sleeve 36 is slidably mounted on the lower end parts of the strips of the claws 35 which it maintains in the bore of the shaft 31.

When the actuating rod 20 is moved in translation in the tubular shaft 31, between its position shown in FIG. 3A and its position shown in FIG. 3B, the guide sleeve 36 is shifted by sliding on the end of the longitudinally extending strips of the claws 35 which remain in a fixed axial position in the shaft 31.

The actuating rod 20 comprises a lower part having a diameter which is reduced relative to the upper part separated from the upper part by a frustoconical or tapered surface 20a.

In the position of the actuating rod 20 shown in FIG. 3A, the inner surface of the claws 35 is in contact with the part of small diameter of the actuating rod 20. The outer surface of the claws 35 is moreover in contact with the inner surface of the upper end of the guide sleeve 36.

The upper parts of the claws engaged in the radial openings 33 of the shaft 31 are then maintained in their retracted position. The radially outer end parts of the claws are then slightly retracted relative to the outer surface of the shaft 31.

When the actuating rod 20 is in the position shown in FIG. 3B, a part of larger diameter of the rod 20 is in confronting relation to the upper parts of the claws 35, and the sleeve 36 has shifted downwardly so as to release the upper part of the claws 35.

The claws 35 are shifted radially outwardly in the openings 33 at the moment the tapered surface 20a passes through the level of their upper part.

The outer radial ends of the upper parts of the claws 35 engaged in the openings 33 have reached a position in which they project from the outer lateral surface of the shaft 31.

When the shaft 31 constituting the lower part of the pole of the mounting and extracting device is inserted in a locking sleeve 8 so that the projecting annular part 32 of the tool bears against the shoulder of the sleeve, the claws 35 are located exactly in alignment with the groove 9 machined in the locking part of the locking sleeve 8.

In their position in which they project out of the shaft 31, the claws 35 enter the groove 9 and in this way provide a connection between the pole of the mounting and extracting device and the locking sleeve 8 by engagement of the claws in the groove 9.

The lower part of shaft 31 further comprises radial openings 38 below the claw openings 35.

Engaged in each of the openings 38 is a ball 39 which is in contact in the bore of the shaft 31 with the outer surface of the guide sleeve 36.

Further, a thin bush 40 is mounted coaxially around the shaft 31 by means of an annular heel 41 constituting the lower part of the bush 40. The annular heel 41 is gripped between a shoulder in the lower part of the shaft 31 and an end part of annular shape of a tapered nose-shaped member 42 screwed on the end of the body of the shaft 31 having a screw-threaded part.

The upper part of bush 40 includes longitudinally extending slots extending to the vicinity of its median part 4a so as to define flexible strips capable of bending when they are biased in the radially outward direction by the balls 39 in their upper part.

Each of the flexible strips of the upper part of the expansion bush 40 is bent inwardly so as to define a bearing surface 40b for a ball 39.

The outer surface of the guide sleeve 36 includes a tapered or frustoconical part 36a between a lower thick end part and an upper end part of cylindrical shape adapted to come into contact with the outer part of the claws 35.

When the actuating rod 20 connected to the guide sleeve 36 moves between its position shown in FIG. 3A and its position shown in FIG. 3B, the movement of the tapered part 36a of the outer part of the sleeve 36 in contact with the balls 39 shifts them in the outwardly radial direction in the radial openings 38.

As can be seen in FIG. 3B, the shifting of the balls 39 causes an expansion of the upper part of the bush 40 constituted by the bendable strips.

The outer edge of the bend line of the bent part 40b of the strips is then located on a cylinder having a diameter larger than the outside diameter of the lower part of a locking sleeve 8 of a guide tube.

The inwardly bent end parts of the strips of the expansion bush include a substantially axially extending end flange 40c which is placed in a radially inwardly extending notch of the shaft 31 below a shoulder.

The flange 40c of the strips constantly remains in the notch of the shaft 31 whose outside diameter is less than the inside diameter of the locking sleeve 8.

In the position of expansion of the strips of the expansion bush 40, shown in FIG. 3B, the upper flange 40c of the flexible strips is placed inside the locking sleeve 8 engaged in the mounting and inserting position on the shaft 31.

On the other hand, the outer bending line of the part 40b of the flexible strip is located, as mentioned before, outside a cylindrical surface downwardly extending the outer surface of the locking sleeve 8.

When the locking sleeve 8 is engaged in the opening of the end nozzle and inside the bore of a guide tube 13 as shown in FIG. 3B, the locking sleeve 8 is maintained on the periphery of the shaft 31 by the claws 35 and the guide sleeve 36 effects by means of the balls 39 the expansion of the bush 40.

The lower part of the pole formed by the tapered nose member 42 connected to the lower part of the shaft 31 enters the divergent opening of the end nozzle and then the upper part of the guide tube 13.

Even in the case where a flexible strip of the upper part of the tube 13 is bent inwardly, the nose member 42 can enter the interior of the tube.

When the upper part of the expansion bush 40 constituted by the outwardly bent strips enters the interior of the tube 13, the expansion bush 40 has a tendency to urge the flexible strips of the guide tube 13 outwardly.

In the case where a strip of the guide tube 13 is bent inwardly, the expansion bush 40 straightens this strip by bending it outwardly so that the entrance part of the guide tube 13 is slightly upwardly divergent as shown in FIG. 3B.

The locking sleeve 8, fixed to the peripheral part of the shaft 31 by the hooking claws 35, comprises a lower end part which becomes very precisely engaged between the upper flange 40c of the strips of the expansion bush 40 and the end part of the guide tube 13 which is slightly outwardly divergent.

Thus it is possible to axially engage, with no risk of a bending of the flexible strips of the guide tube 13, the locking sleeve 8 in the guide tube 13 disposed in the opening extending through the dismountable end nozzle.

Consequently, it is possible to pursue without risk the shifting of the locking sleeve 8 in the axial direction until this engagement of the sleeve in the guide tube 13 is manifested by a force exceeding a pre-determined limit.

The locking of the guide tube 13 is then achieved by exerting a thrust on the locking sleeve 8 by engagement of its radially projecting part in a groove in the opening of the end nozzle. The thrust on the locking sleeve 8 is exerted by means of the radially projecting annular part 32 of the inner tubular element 19. The displacement for the clamping of the sleeve is achieved by turning the nut 30 engaged with the screw 29 constituting the upper part of the inner tubular element 19, the nut 30 coming into contact with the head 24 by its shoulder 30b.

The locking sleeve 8 is then finally locked in the opening of the end nozzle by deformation of parts of the ring 8b in recesses which open onto the upper part of the opening of the end nozzle.

Note that, during the descent of the sleeve in the opening of the end nozzle and in the guide tube, the guide tube is constantly spread outwardly by the outer bend line parts of the strips of the expansion bush constituting the part having the largest diameter of the expansion bush.

Any risk of a bending and damage to the strips constituting the upper part of the guide tube is in this way avoided.

The device according to the invention therefore achieves in a very reliable manner the engagement of the locking sleeves in the guide tubes, even if the upper part of the guide tube is damaged.

The device may comprise means other than a guide sleeve connected to the actuating rod for shifting the flexible strips of the expansion bush outwardly.

The expansion bush may be constructed in any form which permits it to spread apart the flexible strips constituting the end part of a guide tube.

The device according to the invention may be very generally used for mounting and extracting locking sleeves in guide tubes of a fuel assembly of a water cooled reactor of any type comprising a dismountable end nozzle.

What is claimed is:

1. Device for mounting and extracting a locking sleeve having an inner groove relative to a guide tube in a dismountable end nozzle of a fuel assembly disposed under water in a storage pool, said end nozzle of said assembly comprising a transverse plate and openings extending through said transverse plate, each opening receiving an end part of a respective guide tube of said assembly, said end part of each guide tube comprising bendable sectors defined by longitudinally extending slots and a radially projecting hooking part and receiving said locking sleeve in said end part of said guide tube for achieving a radial expansion and a hooking of said guide tube by said hooking part thereof in an annular enlargement of said opening of said end nozzle, said mounting and extracting device comprising a pole for connection in a vertical position to handling and hoisting means disposed over said pool, an actuating rod extending and movable axially in said pole, a lower end part of said pole having a diameter less than the inside diameter of said locking sleeve, a plurality of sleeve-hooking members movably mounted in said lower end part of said pole and having actuating surfaces cooperative with said actuating rod so that said hooking members are shiftable between a retracted position inside said lower part of said pole and a locking sleeve-hooking projecting position of engagement with said inner groove of said locking sleeve when said lower part of said pole is inserted in said locking sleeve, an expansion bush engaged and fixed on said lower part of said pole in a first end part of said bush and comprising longitudinally extending slots defining resiliently bendable strips at least in a second end part of said bush remote from said first end part of said bush, a plurality of balls each mounted to be radially movable in a respective opening in said lower part of said pole and each bearing against a respective bendable strip of said expansion bush, and a cylindrical cam fixed on said actuating rod and bearing against said balls and permitting a displacement of said balls between a retracted position and a position corresponding to an expansion of said bendable strips of said expansion bush to a diameter larger than the outside diameter of said locking sleeve by displacement of said actuating rod.

2. Device according to claim 1, wherein said locking sleeve-hooking members are in the form of hooking claws each having a radially extending end part, said lower part of said pole comprising a plurality of radial openings, said radially extending end part of each hooking claw being inserted in a respective one of said radial openings, each of said claws further comprising a flexible strip extending axially of said pole along said actuating rod, said cylindrical cam being of tubular shape and engaged coaxially of said actuating rod in an axially extending bore of said lower part of said pole around said resiliently flexible strips of said claws for maintaining and gripping an end part of said claws opposed to said radially extending part against said actuating rod.

3. Device according to claim 2, wherein said cylindrical cam comprises an upwardly divergent frustoconical outer surface by which said cam is in contact with said balls.

4. Device according to claim 3, wherein said cam further comprises a cylindrical tubular end part remote from said part of said cam which maintains said claws against said actuating rod by which tubular end part of said cam said cam comes into contact with end parts of said claws adjacent said radial end parts in a position of said actuating rod corresponding to said retracted position of said claws so as to maintain said claws in said retracted position.

5. Device according to claim 1, wherein said expansion bush comprises at an end fixed to said lower part of said pole a radially inwardly projecting fixing heel which is interposed and gripped between a shoulder on said lower part of said pole and a tapered end nose member mounted on said lower part of said pole.

6. Device according to claim 1, wherein said bendable strips of said expansion bush comprise at the free end thereof a part inwardly bent about a bending edge and terminating in a substantially axially extending flange, whereby in said expansion position of said bush produced by a radially outward displacement of said balls, the outer part of said bending edge is located on a cylinder having a diameter larger than the outside diameter of said locking sleeve and said flange has an outer surface which is located on a cylinder having a diameter less than the inside diameter of said locking sleeve.

7. Device according to claim 1, further comprising a plate defining a through opening for guiding and maintaining said lower end of said pole, said pole comprising three coaxial tubular elements, namely a first outer tubular element comprising a bearing ring for bearing against said plate, a second tubular element disposed coaxially in said first element and comprising locking means for locking in said through opening in said plate, and a third tubular element connected to said lower part of said pole, in the lower part thereof projecting out of said first tubular element and said second tubular element, said actuating rod being disposed in a central bore of said third tubular element.

8. Device according to claim 7, wherein said third tubular element comprises in the lower part thereof fixed to said lower part of said pole an annular bearing ledge for bearing against an inner shoulder of said locking sleeve for clamping said guide tube in said dismountable end nozzle by urging said third element in said locking sleeve.

9. Device according to claim 8, wherein said third element comprises an upper part constituting a screw and a nut is engaged on said screw for axially shifting said third element and exerting a thrust on said locking sleeve.

10. Device according to claim 7, wherein said pole comprises a head and an actuating handle fixed on said head for hooking to handling and hoisting means, said head being and connected to the upper end of said first tubular element and of said second tubular element, said first tubular element being connected to said head by a nut for causing said first tubular element to bear against said maintaining and guiding plate, said first tubular element being axially immobile but free to rotate relative to said nut.

11. Device according to claim 7, wherein said locking means of said second tubular element for locking in said through opening of said maintaining and guiding plate are constituted by radially projecting members cooperative with recesses in said maintaining and guiding plate in the manner of a bayonet type of connection.

* * * * *